United States Patent [19]

Brabetz et al.

[11] 4,118,357

[45] Oct. 3, 1978

[54] ADHESIVE AQUEOUS DISPERSIONS OF POLYVINYL ALCOHOL GRAFT POLYMERS WITH ACIDIC HARDENERS AND PROCESS OF PRODUCTION

[75] Inventors: Hartmut Brabetz; Christof Kemenater; Franz Six; Wilhelm Kaiser, all of Burghausen, Germany

[73] Assignee: Wacker-Chemie GmbH, Munich, Germany

[21] Appl. No.: 792,682

[22] Filed: May 2, 1977

[30] Foreign Application Priority Data

May 11, 1976 [DE] Fed. Rep. of Germany ........... 2620738

[51] Int. Cl.$^2$ ................................................ C09J 3/14
[52] U.S. Cl. ...................... 260/29.6 WA; 260/29.6 B; 260/29.6 BM; 260/29.6 BE; 260/29.6 M; 260/29.6 MM; 260/875
[58] Field of Search ................. 260/29.6 WA, 29.6 B, 260/29.6 BM, 29.6 BE, 875, 29.6 M, 29.6 MM

[56] References Cited

U.S. PATENT DOCUMENTS

| 2,843,562 | 7/1958 | Caldwell ...................... 260/29.6 WA |
| 3,461,052 | 8/1969 | Restaino et al. ............. 260/29.6 WA |
| 3,563,851 | 2/1971 | Armour et al. .............. 260/29.6 WA |
| 3,755,234 | 8/1973 | Chujo et al. ................. 260/29.6 WA |

*Primary Examiner*—Eugene C. Rzucidlo
*Attorney, Agent, or Firm*—Hammond & Littell

[57] ABSTRACT

An aqueous copolymer adhesive dispersion having a long pot life and giving highly waterproof bonds, comprising an acid hardener of water-soluble acids having pKs of under 0 and an aqueous dispersion of a pre-crosslinked polyvinyl ester grafted onto polyvinyl alcohol, said polyvinyl ester being an ester of an acid of 1 to 12 carbon atoms and said pre-crosslinking caused by the presence of small amounts of poly-ethylenically-unsaturated compounds in the monomer mixture, as well as the aqueous dispersion and the method for its production.

15 Claims, No Drawings

ADHESIVE AQUEOUS DISPERSIONS OF POLYVINYL ALCOHOL GRAFT POLYMERS WITH ACIDIC HARDENERS AND PROCESS OF PRODUCTION

RELATED ART

Aqueous polyvinyl ester dispersions have a number of excellent properties as adhesives, such as good adhesive power, rapid hardening colorless adhesive joints and good workability. Due to the content of hydrophilic protective colloids required in the dispersions to produce stable dispersions, however, adhesive joints produced with these dispersions are not very waterproof.

There has been no lack of attempts in the past to improve the waterproofness of these polyvinyl ester adhesives. Thus resorcinol-formaldehyde, phenol-formaldehyde and urea-formaldehyde resins have been added to the dispersions to improve the waterproofness of the adhesive joints. The resins were added to reduce the hydrophilic nature of the protective colloids and to reduce, in this manner, the swelling of the adhesive joints in water. However, while the waterproofness of the adhesive joints is improved by these additives, the pot-life time was found to be very short in these systems.

Another way of reducing the water sensitivity caused by the presence of the protective colloids in polyvinyl ester adhesives is described in German Published Application DOS 15 94 194. Here polyvinyl acetate homopolymer or copolymer dispersions mixed with 2% to 12% by weight polyvinyl alcohol as a protective colloid are used in mixture with acid metal salt hardeners. Preferably chromium nitrate and perchlorate or aluminum chloride and nitrate are used. The free acids are unsuitable as hardener additives in these mixtures.

OBJECTS OF THE INVENTION

An object of the present invention was thus to find an adhesive composition whose polymer dispersion component is to a great extent free of the negative effects of the protective colloid, and where, in addition to special salts, free acids are also suitable as a hardening component.

Another object of the present invention is the development of an aqueous copolymer dispersion useful for adhesives of increased waterproofness when hardened with water-soluble acids with pKs of under 0 or heavy metal salts thereof, consisting essentially of aqueous dispersions of pre-crosslinked polyvinyl esters grafted onto polyvinyl alcohol wherein said grafted polymer contains from 2% to 14% by weight of said polymer of a polyvinyl alcohol with a degree of hydrolysis of between 74 and 97 mol % having grafted thereon (1) at least 70% by weight of said polymer of a vinyl ester selected from the group consisting of vinyl esters of alkanoic acids having from 1 to 12 carbon atoms and mixtures thereof, (2) from 0 to 10% by weight of said polymer of at least one monoethylenically-unsaturated compound copolymerizable with said vinyl ester and (3) from 0.01% to 5% by weight of at least one compound having at least two ethylenically-unsaturated bonds and being copolymerizable with said vinyl ester, said aqueous dispersion having a solids content of from 40% to 60% by weight.

A further object of the present invention is the development of a process for the production of the above aqueous copolymer dispersion.

A still further object of the present invention is the development of an aqueous copolymer adhesive dispersion having a long pot life consisting essentially of from 99.5% to 90% by weight of the above aqueous copolymer dispersion and from 0.5% to 10% by weight of an acid hardener selected from the group consisting of water-soluble acids having pKs under 0, salts of monobasic acids having pKs of under 0 with heavy metals selected from the group consisting of $Cr^{III}$, $Al^{III}$ and $Fe^{III}$, and zirconyl salts of monobasic acids having pKs of under 0, and mixtures thereof.

These and other objects of the present invention will become more apparent as the description thereof proceeds.

DESCRIPTION OF THE INVENTION

The invention relates to the use of aqueous copolymer dispersions in admixture with acid water-soluble hardener additives to give adhesives of increased waterproofness and long pot time which are characterized in that water-soluble acids with pKs below 0 and/or chromium$^{(III)}$ and/or aluminum and/or iron and/or zirconyl salts of monobasic acids with pKs below 0 are added to aqueous dispersions of pre-crosslinked grafted polymers of vinyl esters and at least di-olefinically-unsaturated monomers grafted onto a partly saponified, water-soluble polyvinyl alcohol which is contained in amounts of 2% to 14%, preferably 3% to 10% by weight in the polymer mixture, and having a degree of hydrolysis of between 74 and 97 mol %, preferably 81 to 94 mol %, said grafted vinyl esters consisting of vinyl esters with 1 to 18 carbon atoms in the acid radical and its mixtures, preferably vinyl acetate and not more than 30% by weight of the total monomers of additional monomers copolymerizable therewith, which include 0.01% to 5% by weight of the total monomers of compounds having at least two ethylenically-unsaturated double bonds in the molecule, preferably triallyl cyanurate.

More particularly, the present invention relates to an aqueous copolymer dispersion useful for adhesives of increased waterproofness when hardened with water-soluble acids with pKs of under 0 or heavy metal salts thereof, consisting essentially of aqueous dispersions of pre-crosslinked polyvinyl esters grafted onto polyvinyl alcohol wherein said grafted polymer contains from 2% to 14% by weight of said polymer of a polyvinyl alcohol with a degree of hydrolysis of between 74 and 97 mol % having grafted thereon (1) at least 70% by weight of said polymer of a vinyl ester selected from the group consisting of vinyl esters of alkanoic acids having from 1 to 12 carbon atoms and mixtures thereof, (2) from 0 to 10% by weight of said polymer of at least one mono-ethylenically-unsaturated compound copolymerizable with said vinyl ester and (3) from 0.01% to 5% by weight of at least one compound having at least two ethylenically-unsaturated bonds and being copolymerizable with said vinyl ester, said aqueous dispersion having a solids content of from 40% to 60% by weight; as well as the method for the production of said aqueous copolymer dispersion, which consists essentially of the steps of copolymerizing a monomer mixture of sufficient amount to give a final polymer of (1) at least 70% by weight of said polymer of a vinyl ester selected from the group consisting of vinyl esters of alkanoic acids having from 1 to 12 carbon atoms and mixtures thereof, (2) from 0 to 10% by weight of said polymer of at least one mono-ethylenically-unsaturated compound copolymerizable with said vinyl ester and (3) from 0.01% to 5% by weight of at least one compound having at least two ethylenically-unsaturated bonds and being copolymerizable with said vinyl ester, onto from 2% to 14% by weight of said polymer of a polyvinyl alcohol with a degree of hydrolysis of between 74 and 97 mol % under polyvinyl alcohol graft polymerization conditions at a temperature of from 30° C. to 80° C. in an aqueous dispersion and recovering said aqueous copolymer dispersion.

The invention also relates to the aqueous copolymer adhesive dispersion having a long pot life, consisting essentially of from 99.5% to 90% by weight of said aqueous copolymer dispersion and from 0.5% to 10% by weight of an acid hardener selected from the group consisting of water-soluble acids having pKs under 0, salts of monobasic acids having pKs of under 0 with heavy metals selected from the group consisting of $Cr^{III}$, $Al^{III}$ and $Fe^{III}$, and zirconyl salts of monobasic acids having pKs of under 0, and mixtures thereof.

Surprisingly, it is possible, when using these pre-crosslinked graft copolymers which contain polyvinyl alcohol, not in admixture with the polymer component as a protective colloid, but rather with the polymer components grafted primarily onto the polyvinyl alcohol, to achieve an increase of the waterproofness and a higher wet binding strength of the adhesive bond on treatment with free acids. It is known that polyvinyl alcohol in aqueous solution is not brought into a water-insoluble form by these acids, although this is accomplished by the addition of aluminum salts, by crosslinking. At the same time, it becomes possible to offer waterproof adhesive systems which attain pot-life times of over 4 weeks.

The graft base used for the pre-crosslinked graft polymers according to the invention is a partly saponified polyvinyl alcohol with a degree of hydrolysis of between 74% and 91% by weight, preferably 81% to 95% by weight. In selecting the type of polyvinyl alcohol, it must be kept in mind that the extent of the grafting reaction depends, among others, on the degree of hydrolysis. A high content of residual acetate groups enhances the graft reaction. The addition of small amounts of anionic or nonionic emulsifiers in amounts of up to 1% by weight of the total monomers enhances the graft reaction further. The content of polyvinyl alcohol in the total graft polymer should be 2% to 14% by weight, preferably 3% to 10% by weight.

The pre-crosslinked graft polymer dispersions are produced by using free-radical chain starters, whereby reactive radicals are formed during their decomposition. This can be caused by heat or by the introduction of reducing agents which enhance a graft reaction on polyvinyl alcohol. These initiator systems are organic peroxides and hydroperoxides in amounts of 0.1% to 3% by weight, preferably 0.5% to 2% by weight, which form highly reactive radicals during their decomposition, such as, for example, tert.-butyl hydroperoxide (forming the methyl radical) in combination with suitable reducing agents in amounts of 0.05% to 3% by weight, such as sodium formaldehyde sulfoxylate, sodium sulfite, sodium hydrogen sulfite, dithionite. The graft reaction can also be caused by the direct polyvinyl alcohol radical formation by $Ce^{IV}$ ions, such as ceric ammonium sulfate or ceric nitrate; by manganese$^{III}$ ions, such as dimanganese trisulfate in the presence of sulfuric acid or manganese triacetate; by iron$^{III}$ ions, or by potassium permanganate. These various heavy metal ions are employed in 0.1 to 3 molar solutions of the salts.

Suitable for use according to the invention are aqueous dispersions of pre-crosslinked graft polymers, where copolymers of vinyl esters, with each other and with other ethylenically-unsaturated monomers, are grafted on polyvinyl alcohol, and where the portion of polymerized vinyl esters in the polymer is at least 70% by weight.

Suitable as vinyl esters are those of straight or branch-chained alkanoic acids with 1 to 12 carbon atoms. Examples of these vinyl esters are vinyl formiate, vinyl acetate, vinyl propionate, vinyl 2-ethylhexanoate, vinyl isononoate, vinyl laurate and vinyl esters of the versatic ® acids. These are synthetic, saturated, mainly tertiary monocarboxylic acids with 9 to 11 carbon atoms. Preferably, vinyl acetate is utilized, however, particularly in amounts of at least 70% of the weight of the polymer.

Other ethylenically-unsaturated monomers which can be copolymerized with the vinyl esters are the monoethylenically-unsaturated monomers in amounts of from 0 to 10% by weight of the polymer produced. These are, for example, alkenoic acids having 3 to 10 carbon atoms and their esters with alkanols having 1 to 18 carbon atoms, such as acrylic acid or methacrylic acid or their esters with primary or secondary alcohols with mostly 1 to 18 carbon atoms, preferably 1 to 12 carbon atoms, such as methyl alcohol, ethyl alcohol, propyl alcohol and butyl alcohols and mixtures of short-chained alcohols, 2-ethylhexyl alcohol and lauryl alcohol; as well as cyclohexyl alcohol; $\alpha,\beta$-unsaturated alkanoic acids with a carbon chain between 4 and 10 carbon atoms, such as crotonic acid, isocrotonic acid and their esters with methyl alcohol, ethyl alcohol, propyl alcohol and butyl alcohol and mixtures of short-chained alcohols, as well as 2-ethylhexyl alcohol, cyclohexyl alcohol and lauryl esters or mixtures thereof; alkenes having 2 to 6 carbon atoms, like ethylene, propylene, butylene; vinyl halides and vinylidene halides, such as vinyl fluoride, vinyl chloride, vinylidene fluoride, vinylidene chloride; styrene; $\alpha,\beta$-unsaturated alkendioic acids with from 4 to 10 carbon atoms, such as maleic acid, fumaric acid and itaconic acid and their monoesters and diesters of the same alkanols with 1 to 18 carbon atoms and cyclohexanol; nitrogen-containing monoolefinically-unsaturated monomers, particularly nitrides, amides, N-methylolamides, Mannich bases of N-methylolamides, lower alkanoic acid esters of N-methylolamides, lower alkyl ethers of N-methylolamides, of alkenoic acids having 3 to 6 carbon atoms and allyl carbamates (except for the nitrile), like acrylonitrile, acrylamide, methacrylamide, N-methylolacrylamide, N-methylolmethacrylamide, N-methylol allyl carbamate or N-methylol lower alkylethers, Mannich bases or N-methylol lower alkanoic acid esters of N-methylolacrylamide, N-methylolmethacrylamide, and N-methylol allyl carbamate in amounts of not more than 10% by weight, generally 3% to 6% by weight of the polymer.

In addition, the graft copolymers contain from 0.01% to 5% by weight, related to the total polymer, of monomers having at least two ethylenically-unsaturated double bonds in the molecule. Preferably the compounds having at least two ethylenically-unsaturated bonds and being copolymerizable with said vinyl ester are compounds having two and three ethylenically-unsaturated bonds and no other unsaturation, particularly lower alkenyl lower alkenoates, such as, preferably, vinyl crotonate, or allyl acrylate and allyl methacrylate, lower alkylene bis-lower-alkenoic acid amides such as methylene bisacrylamide, triallyl cyanurate, di-lower alkenoic acid esters of lower alkanediols such as hexanediol-diacrylate, tri-lower alkenoic acid esters of lower alkanepolyols such as pentaerythritol-triacrylate and trimethylolpropane-triacrylate, or, in addition, diallyl phthalate, and polyoxyethylene glycol esters of lower alkenoic acids such as trioxyethylene glycol-dimethyacrylate. Vinyl crotonate and methylene bisacrylamide are the preferred cross-linking monomers.

The polymer dispersions used according to the invention have a total solids content of 40% to 60% by weight, preferably 45% to 55% by weight.

Suitable as acid compounds, which ensure a good waterproofness of the adhesive joint, are the water-soluble salts of chromium, aluminum and iron, such as chromium$^{III}$ nitrate, chromium$^{III}$ chloride, aluminum$^{III}$ chloride, aluminum$^{III}$ nitrate, iron$^{III}$ chloride, or zirconium oxychloride. Chromium$^{III}$ chloride, aluminum$^{III}$ nitrate and chromium$^{III}$ nitrate are preferred, but also free acids which have pKs under 0, such as hydrochloric acid, nitric acid, perchloric acid and mixtures thereof, may be used. The metal salts are added in the form of their saturated solutions, the free acids, as 5 N aqueous solutions, in amounts of 0.5% to 10%, preferably 2% to 8%, related to the weight of the polymer dispersion. The acid compounds are added before using the adhesive mixture of the dispersion.

In order to reduce the film-forming temperature, it is customary in some cases to add to the dispersion additionally, plasticizers or film-forming aids in amounts of up to 10% by weight of the polymer content.

Dispersions of the pre-crosslinked polyvinyl alcohol graft copolymers of the invention and dispersions which contain polyvinyl alcohol in admixture with the resin dispersion differ clearly in their solution behavior. Films of the vinyl acetate copolymers not grafted onto polyvinyl alcohol, for example, dissolve in ethyl acetate in amounts of from 80% to 100%. The pre-crosslinked graft copolymer dispersion films used according to the invention, however, have a solubility of only 30% to 55% in this solvent. If pre-crosslinked graft copolymers of vinyl acetate homopolymers or copolymers onto polyvinyl alcohol are mixed with a suitable amount of the acid hardening agent, adhesive joints can be produced with these mixtures on wood which show an excellent waterproofness.

Adhesive wood joints, as they can be produced with the adhesives according to the invention, are used with particular advantage in exterior wood constructions; also for windows and doors which are exposed to changing climatic conditions, water of condensation as well as spray and bilge water; for wood panellings in wood constructions in swimming pools, saunas, and shower cabins; or weathered exterior wood coverings.

The following examples are illustrative of the practice of the invention without being limitative in any respect.

EXAMPLES

The production of a dispersion according to the invention will be described in the following example:

EXAMPLE 1

In a reactor, which is provided with a reflux condenser, stirrer, dosing facilities, nitrogen feed, as well as a heatable and coolable jacket, 29.5 parts by weight of water, 2 parts by weight of a partly saponified polyvinyl alcohol with a degree of hydrolysis of 90 mol % and 0.1 parts by weight of an ethoxylated nonylphenol (23 mols ethylene oxide) were charged. After flushing the reactor with nitrogen, 25% by weight of the monomer solution, which consisted of 45.3 parts by weight of vinyl acetate, 0.04 parts by weight of t-butyl hydroperoxide and 0.014 parts by weight of triallylcyanurate, were charged into the reactor and the reaction mixture was heated. When the temperature of the reaction mixture reached 50° C., the dosing in of a supply feed was commenced, which was composed of 6.6 parts by weight of water, 0.02 parts by weight of sodium formaldehyde sulfoxylate and 0.02 parts by weight of sodium bicarbonate. The dosing of this supply feed was effected at such a rate that it was completed one hour after the end of the two monomer supply feeds, of which one consisted of the remaining 75% by weight of the vinyl acetate solution and the outer of 3 parts by weight of N-methylolacrylamide and 10.4 parts by weight of water.

The dosing of the two monomer solutions commenced when an internal temperature of 65° C. had been attained. The polymerization was effected at a temperature of the reaction mixture of 65° C. to 70° C. The rate of flow of the two monomer supply feeds was so regulated that there was no refluxing. After all dosings had been completed, the polymerization was continued for 1 hour at 70° C. and then the mixture was cooled. A stable, coarsely divided and coagulate-free dispersion was obtained which, with a solids content adjusted to 50%, had a viscosity of 12,000 mPa.s (Epprecht-Rheometer at 20° C., measuring cup D, stage III). The dispersion could be modified subsequently with 3% by weight of dibutyl phthalate, related to the weight of the dispersion, in order to reduce the film-forming temperature.

EXAMPLE 2

Some of the graft copolymer dispersions with different hardening agents used according to the invention are here described. The essential mixing data are given in Table 1. For the graft polymerization, as in Example 1, a partly saponified polyvinyl alcohol was utilized. The finished adhesive mixture was obtained by mixing the dispersion directly with the respective hardeners before it was to be used as an adhesive. This was done only to provide uniform comparison conditions and was not limited by the pot time of the mixtures.

Table 1

| Dispersion No. | Solids Content in % by Weight | Polymer Composition in % by Weight | Hardening Agent | % by Weight of the Dispersion |
|---|---|---|---|---|
| 1 | 50 | 94.25 VAC<br>5.65 PVA<br>0.10 TAC | HCl | 8 |
| 2 | 50 | 71.77 VAC<br>23.92 VL<br>3.83 PVA<br>0.48 TMPT | CrCl$_3$ | 7.5 |
| 3 | 52 | 76.05 VAC<br>19.01 DAHM<br>4.75 PVA<br>0.19 PETA | ZrOCl$_2$ | 5 |

Table 1-continued

| Dispersion No. | Solids Content in % by Weight | Polymer Composition in % by Weight | Hardening Agent | % by Weight of the Dispersion |
|---|---|---|---|---|
| 4 | 50 | 78.81 VAC<br>17.30 E<br>2.84 PVA<br>0.05 VCr | H$_2$SO$_4$ | 6 |
| 5 | 45 | 90.23 VAC<br>2.79 CS<br>6.52 PVA<br>0.46 MBAA | Cr(NO$_3$)$_3$ | 5 |
| 6 | 50 | 91.61 VAC<br>4.82 AA<br>3.37 PVA<br>0.20 VCr | FeCl$_3$ | 4 |
| 7 | 50 | 90.36 VAC<br>5.77 NMA<br>3.84 PVA<br>0.03 TAC | Cr(NO$_3$)$_3$ | 5 |

VAC = vinyl acetate
VL = vinyl laurate
PETA = pentaerythritol triacrylate
MBAA = methylene bisacrylamide
PVA = polyvinylalcohol
DAHM = diethylhexyl maleate
E = ethylene
CS = crotonic acid
TAC = triallyl cyanurate
TMPT = trimethylolpropane triacrylate
VCr = vinyl crotonate
AA = acrylamide
NMA - N-methylolacrylamide All adhesive mixtures listed in the above Table 1 were used successfully for gluing wood and led to adhesive joints with excellent waterproofness.

EXAMPLE 3

This example shows the great water-resistance of adhesive mixtures from pre-crosslinked graft polymers on polyvinyl alcohol and free acids as hardening agents. The water-resistance achieved is the more surprising, as free acids, for example, cannot precipitate polyvinyl alcohol solutions, as is known from certain salt solutions.

The pre-crosslinked graft copolymer dispersion as described in Example 2(1) was used for the adhesive joints.

The production of the test pieces and the testing of the wet binding strength were effected according to DIN 68 603, requirement group B 3/5 (cold water strength) and requirement group B 4/9 (hot water strength). DIN is the published test procedures of the German Industry. The test of requirement group B 3/5 prescribes, substantially, storage for 7 days in a normal climate (20° C., 65% relative humidity) after gluing the wood panels; subsequently, the panels are stored for 4 days in cold water at 20° C. ± 2° C. and tested immediately thereafter on the tensile testing machine at a withdrawal rate of 50 mm/min.

Requirement group B 4/9 prescribes, likewise, storage for 7 days in a normal climate after gluing; subsequently, the test provides for storage for 6 hours in boiling water followed by storage for 2 hours in cold water. Immediately thereafter, the tensile test is run with a withdrawal rate of 50 mm/min.

The pot times of the mixtures are surprisingly long when the free acids are used, and in all cases over 4 weeks.

The results are compiled in Table 2.

Table 2

| Hardening Agent | HClO$_4$ | HCl | H$_2$SO$_4$ | HNO$_3$ | H$_3$PO$_4$ | HCOOH |
|---|---|---|---|---|---|---|
| Amount in % by Weight of the 5 N Acid | 5 | 5 | 5 | 5 | 5 | 5 |
| pKs-Value | −9 | −6 | −3<br>1.92 | −1.3 | 1.96 | 3.8 |
| Tensile Strength B 3/5 kp . cm$^{-2}$ cold water | 27 | 24 | 22 | 26 | 5 | 0 |
| Tensile Strength B 4/9 kp . cm$^{-2}$ hot water | 35 | 31 | 34 | 33 | 15 | 6 |

These results demonstrate that mixtures of strong acids with pre-crosslinked graft copolymer dispersions yield surprisingly strong, water-resistant adhesive joints.

EXAMPLE 4

The addition of acid hydrolyzing salts of monobasic acids with pKs under 0 and metal ions of chromium$^{III}$, aluminum$^{III}$, iron$^{III}$ and zirconyl ion in admixture with the pre-crosslinked graft copolymer dispersions on polyvinyl alcohol also yields excellent wet-strength binding values of the adhesion joints. The values of the adhesive strength listed in the following Table 3 were obtained with the dispersion described in Example 2(7). The pot time of the adhesive mixtures is shorter, however, than in the adhesive mixtures produced with free acids as hardening agents. In every instance, however, the pot time is more than 48 hours. In all cases, 0.03 gram equivalents of hardening agent were used per 100 grams of dispersion.

Table 3

| Hardening Agent | Cr(NO$_3$)$_3$ | Al(NO$_3$)$_3$ | CrCl$_3$ | FeCl$_3$ | ZrOCl$_2$ | Fe$_2$(SO$_4$)$_3$ |
|---|---|---|---|---|---|---|
| Tensile Strength B4/9(kp.cm$^{-2}$) hot water | 47 | 45 | 43 | 41 | 41 | 0 |

EXAMPLE A (Comparison Example - Uncrosslinked and Ungrafted)

In a reactor provided with reflux condenser, stirrer, dosing facilities, nitrogen feed, as well as a heatable and coolable jacket, 35.3 parts by weight of water, 2.4 parts by weight of a partly saponified polyvinyl alcohol with a degree of hydrolysis of 90 mol %, and 0.1 parts by weight of an ethoxylated nonylphenol (23 mols ethylene oxide) were charged. After flushing the reactor with nitrogen, a quarter of the total supply of vinyl acetate monomer mixture, which consists of 54.2 parts by weight of vinyl acetate and 0.02 parts by weight H$_2$O$_2$(30%) were charged into the reactor and the reaction mixture was heated. At a temperature of the reaction mixture of 50° C., the dosing of a supply feed was commenced, which supply feed was composed of 7.9 parts by weight of water and 0.07 parts by weight of hydrogen peroxide (30%). The dosing of this supply feed was effected at such a rate that it was completed together with the supply of vinyl acetate.

The dosing of the residual acetate monomer mixture was started at an internal temperature of 65° C. The polymerization was effected at a temperature of the reaction mixture of 65° C. to 70° C., the rate of flow of the two supply feeds being so regulated that there was no refluxing. After the dosings were completed, the polymerization was continued for 1 hour at 70° C. and then the mixture was cooled. A stable, coarsely-divided and coagulate-free dispersion was obtained which, with a solids content adjusted to 50% by weight, had a viscosity of 6,000 mPa.s (Epprecht-Rheometer at 20° C., measuring cup D, stage III).

EXAMPLE B (Comparison Example, Pre-Crosslinked but not Grafted)

The dispersion according to this example was prepared in the same manner as the dispersion in Example A, but in the vinyl acetate monomer supply feed, 0.03 parts by weight triallyl cyanurate were also employed.

EXAMPLE 5

This example shows the advantages of the use of pre-crosslinked graft copolymer dispersions on polyvinyl alcohol, compared to polymer dispersions in which the polyvinyl alcohol is present in admixture with the uncrosslinked polymer dispersion (Example A), and those where the polymer is pre-crosslinked but not grafted on the polyvinyl alcohol (Example B).

The extent of grafting of the copolymer on polyvinyl alcohol and of the pre-crosslinkage were determined by the solubility of the copolymers in ethyl acetate. The following Table 4 shows the solubility of dispersion films, which consist of copolymers according to Examples A and B, respectively. These solubilities are compared with those of the films of the graft copolymer dispersions according to the invention (C and D) from Example 2, Dispersion No. 1 and No. 5

Table 4

| Dispersions | A | B | C | D |
|---|---|---|---|---|
| Solubility in Ethyl Acetate | 87% | 85% | 52% | 41% |

The dispersions investigated for their solubility in ethyl acetate were also tested for their wet binding strength when used as adhesives according to the methods described in Example 3. The dispersions were mixed with 5% by weight of a saturated chromium$^{III}$ nitrate solution and used for adhesive joints. The wet strength values found are compiled in Table 5.

Table 5

| Dispersions | A | B | C | D |
|---|---|---|---|---|
| Tensile Strength B 3/5 kp . cm$^{-2}$ | 5 | 10 | 32 | 34 |
| Tensile Strength B 4/9 kp . cm$^{-2}$ | 15 | 20 | 48 | 51 |

These results clearly show that, when pre-crosslinked graft copolymer dispersions on polyvinyl alcohol are used, the wet binding strength values are far superior to the conventional dispersions which contain polyvinyl alcohol in admixture, and even those dispersions where the polymer is pre-crosslinked but the polyvinyl alcohol is present in admixture with the polymer dispersion.

EXAMPLE 6

The Dispersion No. 7 listed in Example 2 was tested for heat resistance.

A test piece was exposed under constant static load of 50 N ($\doteq$ 5kp) in a warming cabinet to a rising temperature. Normal polyvinyl acetate (PVAC) wood glue dispersions are stable up to a maximum temperature of 120° C., while Dispersion No. 7 was stable up to 180° C. Without the addition of chromium nitrate, the dispersion acted like a normal wood glue with a stability of only up to 90° C. Only by the addition of the hardener solution was the increase achieved.

The preceding specific embodiments are illustrative of the practice of the invention. It is to be understood, however, that other expedients known to those skilled in the art or described herein, may be employed without departing from the spirit of the invention or the scope of the appended claims.

We claim:

1. An aqueous copolymer dispersion useful for adhesives of increased waterproofness when hardened with an acid hardener selected from the group consisting of water-soluble acids with pKs of under 0 and salts of monobasic acids having pKs of under 0 with heavy metals selected from the group consisting of $Cr^{III}$, $Al^{III}$, and $Fe^{III}$, and zirconyl salts of monobasic acids having pKs of under 0, and mixtures thereof consisting essentially of aqueous dispersions of pre-crosslinked polyvinyl esters grafted onto polyvinyl alcohol wherein said grafted polymer contains from 2% to 14% by weight of said polymer of a polyvinyl alcohol with a degree of hydrolysis of between 74 and 97 mol % having grafted thereon (1) at least 70% by weight of said polymer of a vinyl ester selected from the group consisting of vinyl esters of alkanoic acids having from 1 to 12 carbon atoms and mixtures thereof, (2) from 0 to 10% by weight of said polymer of at least one monoethylenically-unsaturated compound copolymerizable with said vinyl ester and (3) from 0.01% to 5% by weight of at least one compound having at least two ethylenically-unsaturated bonds and being copolymerizable with said vinyl ester, said aqueous dispersion having a solids content of from 40% to 60% by weight.

2. The aqueous copolymer dispersion of claim 1 wherein said polyvinyl alcohol is present in an amount of from 3% to 10%.

3. The aqueous copolymer dispersion of claim 1 wherein said polyvinyl alcohol has a degree of hydrolysis of from 81 to 94 mol %.

4. The aqueous copolymer dispersion of claim 1 wherein said graft component 1 vinyl ester contains at least 70% by weight of said polymer of vinyl acetate.

5. The aqueous copolymer dispersion of claim 1 wherein said graft component 2 is present in an amount of from 3% to 6% by weight of said polymer.

6. The aqueous copolymer dispersion of claim 1 wherein said graft components 3 is methylene bisacrylamide.

7. The aqueous copolymer dispersion of claim 1 wherein said graft component 3 is triallyl cyanurate.

8. The aqueous copolymer dispersion of claim 1 wherein said solids content is from 45% to 50% by weight.

9. An aqueous copolymer adhesive dispersion having a long pot life consisting essentially of from 99.5% to 90% by weight of said aqueous copolymer dispersion of claim 1 and from 0.5% to 10% by weight of an acid hardener selected from the group consisting of water-soluble acids having pKs under 0, salts of monobasic acids having pKs of under 0 with heavy metals selected from the group consisting of $Cr^{III}$, $Al^{III}$ and $Fe^{III}$, and zirconyl salts of monobasic acids having pKs of under 0, and mixtures thereof.

10. The method for the production of said aqueous copolymer dispersion of claim 1 which consists essentially of the steps of copolymerizing of monomer mixture of sufficient amount to give a final polymer of (1) at least 70% by weight of said polymer of a vinyl ester selected from the group consisting of vinyl esters of alkanoic acids having from 1 to 12 carbon atoms and mixtures thereof, (2) from 0 to 10% by weight of said polymer of at least one mono-ethylenically-unsaturated compound copolymerizable with said vinyl ester and (3) from 0.01% to 5% by weight of at least one compound having at least two ethylenically-unsaturated bonds and being copolymerizable with said vinyl ester, onto from 2% to 14% by weight of said polymer of a polyvinyl alcohol with a degree of hydrolysis of between 74 and 97 mol % under polyvinyl alcohol graft polymerization conditions at a temperature of from 30° C. to 80° C. in an aqueous dispersion and recovering said aqueous copolymer dispersion.

11. The method of claim 10 wherein said polyvinyl alcohol graft polymerization conditions are in the presence of from 0.1% to 3% by weight based on the total monomer content of at least one organic peroxide forming highly reactive free-radicals on decomposition and from 0.05% to 3% weight based on the total monomer content of at least one peroxide reducing agent.

12. The method of claim 11 wherein said organic peroxide is present in an amount of from 0.5% to 2% by weight based on the total monomer content.

13. The method of claim 11 wherein said organic peroxide is tert. butyl hydroperoxide and said peroxide reducing agent is sodium formaldehyde sulfoxylate.

14. The method of claim 10 wherein said polyvinyl alcohol graft polymerization conditions are by direct polyvinyl alcohol free-radical formation in the presence of from 0.1 to 3 molar concentration of heavy metal cations selected from the group consisting of $Ce^{IV}$, $Mn^{III}$ and $Fe^{III}$.

15. The method of claim 10 wherein said polyvinyl alcohol graft polymerization conditions are by direct polyvinyl alcohol free-radical formation in the presence of from 0.1 to 3 molar concentration of potassium permanganate.

* * * * *